United States Patent
Burton

(12) 
(10) Patent No.: US 6,244,735 B1
(45) Date of Patent: Jun. 12, 2001

(54) HEADLAMP ADJUSTER WITH ANTI-ROTATION BALL STUD HEAD

(76) Inventor: John E. Burton, 707 W. Court St., Ludington, MI (US) 49434

( * ) Notice: Subject to any disclaimer, the term of this patent is extended or adjusted under 35 U.S.C. 154(b) by 0 days.

(21) Appl. No.: 09/309,326

(22) Filed: May 11, 1999

(51) Int. Cl.[7] ................................................. F21V 19/02
(52) U.S. Cl. .......................... 362/528; 362/421; 362/515
(58) Field of Search ................................... 362/515, 528, 362/421; 403/122

(56) References Cited

U.S. PATENT DOCUMENTS

| | | | |
|---|---|---|---|
| 3,691,788 | * 9/1972 | Mazziotti | 403/122 X |
| 4,084,913 | 4/1978 | Schenk | 403/141 |
| 4,111,570 | 9/1978 | Morel | 403/18 |
| 4,200,405 | 4/1980 | Bauer | 403/142 |
| 4,465,393 | 8/1984 | Dieckmann | 403/76 |
| 4,607,976 | 8/1986 | Peek et al. | 403/77 |
| 4,689,725 | 8/1987 | Saijo et al. | 362/289 |
| 4,796,494 | 1/1989 | Eckenrode et al. | 81/484 |
| 4,974,123 | 11/1990 | Luallin et al. | 362/289 |
| 5,011,322 | 4/1991 | Schauwecker | 403/141 |
| 5,034,870 | 7/1991 | Weber | 362/428 |
| 5,045,987 | 9/1991 | Hebert | 362/428 |
| 5,047,904 | 9/1991 | Vraux | 362/289 |
| 5,063,481 | 11/1991 | Martin | 362/421 |
| 5,079,676 | 1/1992 | Lisak | 362/424 |
| 5,095,411 | 3/1992 | Peck et al. | 362/428 |
| 5,153,976 | 10/1992 | Benchaar et al. | 29/436 |
| 5,161,877 | 11/1992 | Wright et al. | 362/421 |
| 5,163,746 | 11/1992 | Lisak | 362/428 |
| 5,165,775 | 11/1992 | Lisak et al. | 362/424 |
| 5,186,531 | 2/1993 | Ryder et al. | 362/428 |
| 5,186,532 | 2/1993 | Ryder et al. | 362/428 |
| 5,214,971 | 6/1993 | Burton et al. | 74/89.13 |
| 5,360,282 | 11/1994 | Nagengast et al. | 403/131 |
| 5,428,511 | 6/1995 | Luallin et al. | 362/428 |
| 5,483,425 | 1/1996 | Luallin et al. | 362/421 |
| 5,577,836 | 11/1996 | Vent et al. | 362/421 |
| 5,673,992 | 10/1997 | Schmitt | 362/267 |
| 5,707,133 | 1/1998 | Burton | 362/428 |
| 5,775,794 | 7/1998 | Schmitt | 362/294 |
| 5,775,795 | 7/1998 | Christian et al. | 362/428 |
| 6,113,301 | * 9/2000 | Burton | 403/122 |

* cited by examiner

*Primary Examiner*—Stephen Husar
(74) *Attorney, Agent, or Firm*—Brian G. Gilpin; Godfrey & Kahn, S.C.

(57) ABSTRACT

A pivot connection includes a ball stud head that creates strong anti-rotation characteristics while retaining substantially full pivotability. The ball stud head includes a midsection that grips the interior of the socket so as to resist rotation. The improved ball stud head is useful in connection with quarter turn style ball sockets and quarter turn headlamp adjusters.

22 Claims, 4 Drawing Sheets

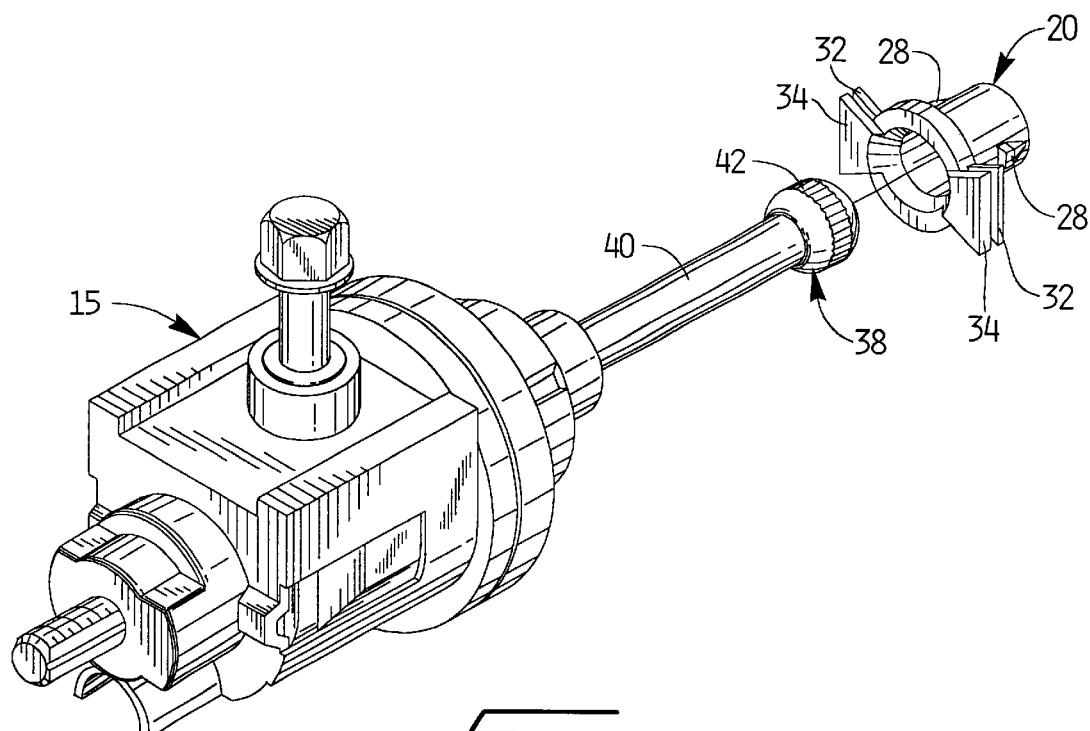
FIG_1
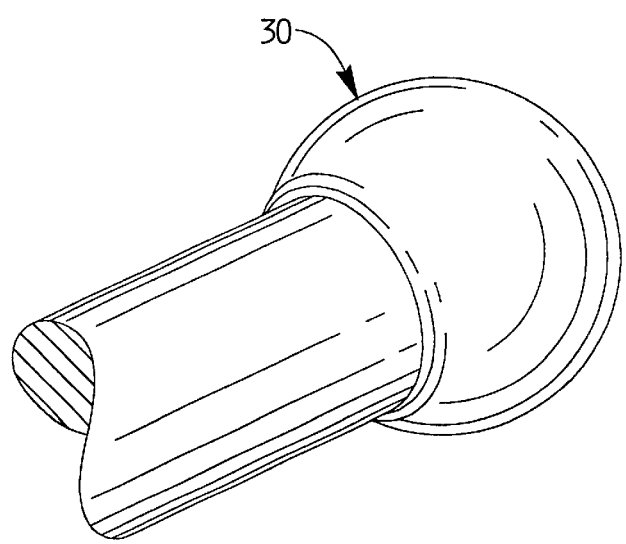
FIG_3
PRIOR ART

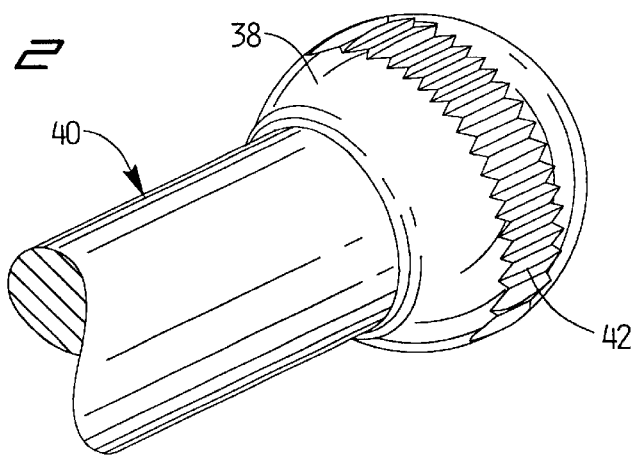
FIG_2
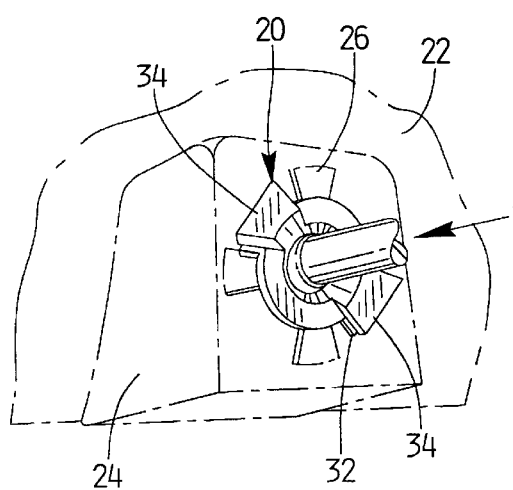
FIG_3A
PRIOR ART
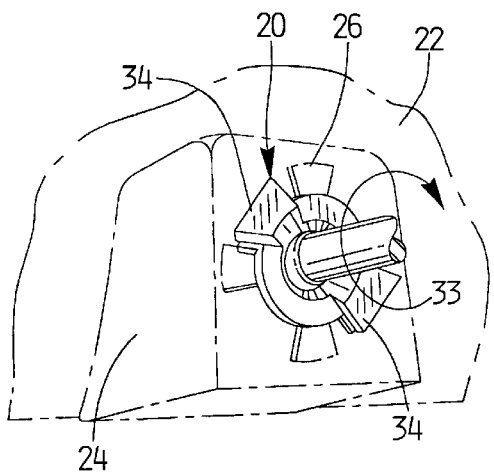
FIG_3B
PRIOR ART
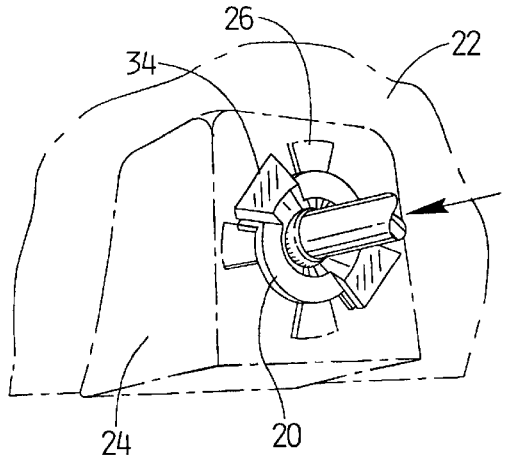
FIG_4A
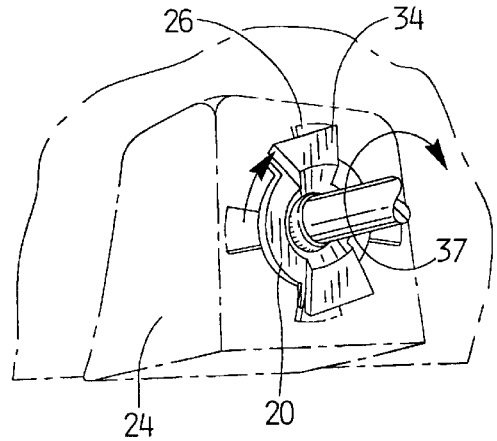
FIG_4B

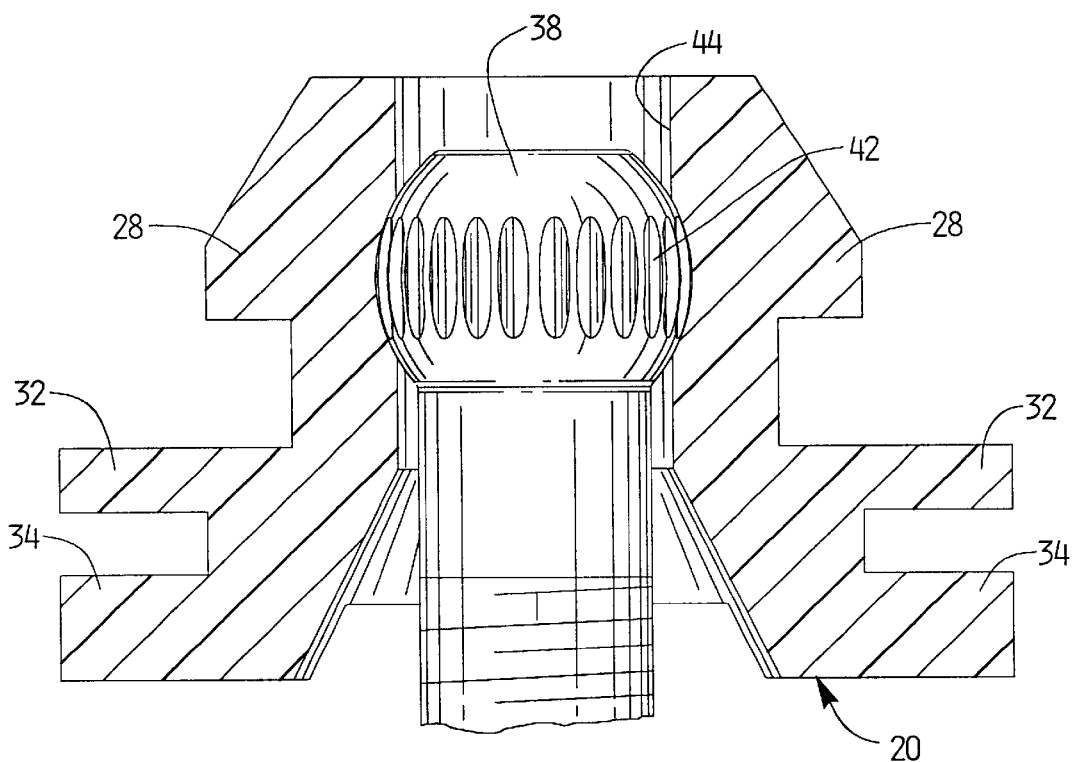
FIG_5
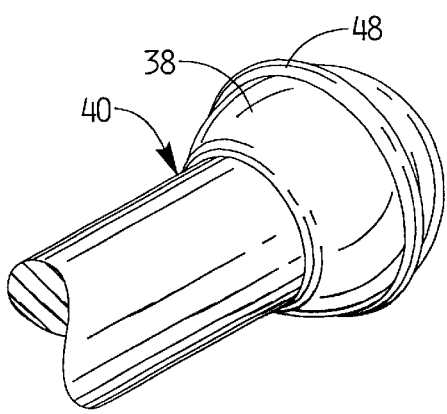
FIG_6
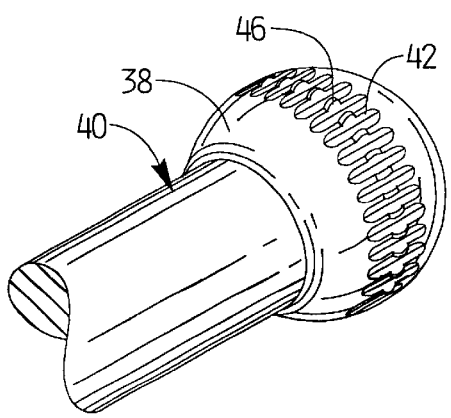
FIG_7

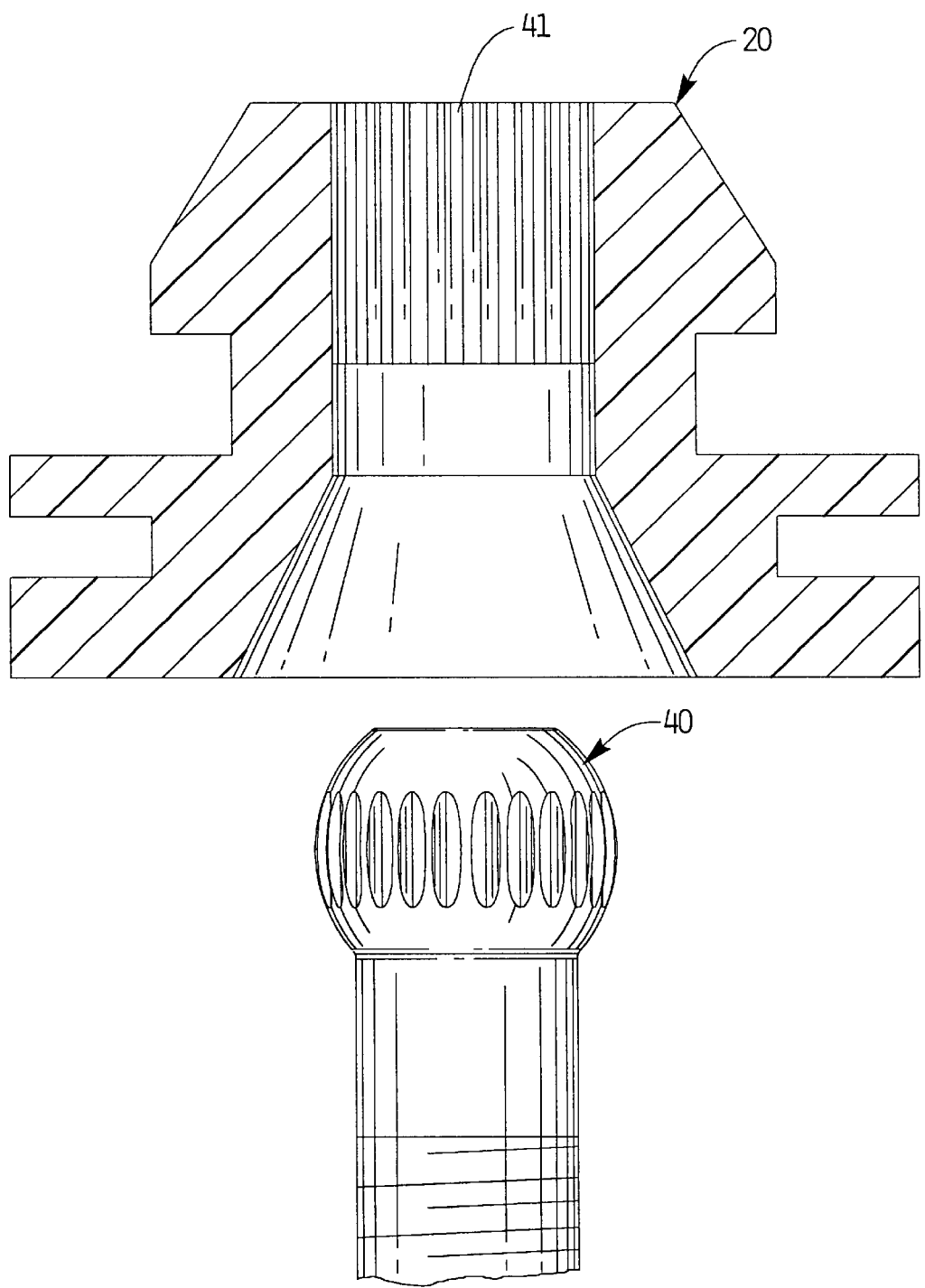

HEADLAMP ADJUSTER WITH ANTI-ROTATION BALL STUD HEAD

BACKGROUND OF THE INVENTION

This invention relates generally to ball studs used in ball joints, and in particular to an anti-rotation ball stud head particularly useful for connecting a headlamp adjuster to a socket on the reflector of a headlamp assembly.

Ball joints typically include a ball stud pivotally engaged in a socket. Such joints have a wide variety of applications where a pivotable connection between two parts is desirable. For example, they may be used in many types of linear actuators and have been found to be particularly useful in automotive lamp assemblies. Automotive lamp assemblies used as headlights typically comprise several basic parts: a support frame, a reflector, a lens, a bulb, and one or more adjusters. The support frame either completely houses the reflector and the bulb on a pivotable mounting to allow the aim of the light to be adjusted using the adjusters or provides a mounting surface for attaching a headlamp adjuster. The lens seals the front of either the support frame or directly to the reflector to protect it from the elements assailing the front end of the vehicle and provides an aerodynamic shape and attractive appearance. The reflector mounts on one fixed ball joint and is adjustable horizontally and vertically using adjusters that interface with the reflector through moving ball joints. The moving ball joints are moveable by actuating the adjusters connected to the moving ball joints by a ball stud having a head and a shaft. A socket is used to secure the pivotable engagement of the ball stud to the reflector. Ball joints are required because of the many possible adjustments that may be made to the orientation of the reflector. If ball joints are not used, the reflector into which the adjusters are fitted will not be sufficiently adjustable because the reflector will not be positionable in both the vertical and horizontal directions. Right angle adjusters are often used to allow the adjustment of the headlight from an adjusting position above the installed headlight. In other applications, motorized adjusters, straight adjusters, or other types of adjuster are used.

In many headlamp adjusters, the ball stud moves when a threaded nut rotates around a threaded shaft section of the ball stud. Because rotation of the ball stud is restrained when the threaded nut rotates around the threaded shaft section of the ball stud, the ball stud moves along its axis with respect to the adjuster thereby effectuating adjustment of the headlamp. In many headlamp adjusters, the ball stud will undesirably rotate unless it is prevented from doing so by structure on the head of the ball stud, e.g., engaging tabs ("ears"). Examples of such adjusters are disclosed in U.S. Pat. Nos. 4,689,725; 5,161,877; and 5,186,531. Sockets used in connection with such adjusters must coact with the ball stud to prevent rotation thereof in order for the adjuster to function because if the ball stud is allowed to rotate, then it will not move along its axis to effectuate adjustment. One drawback to the use of such ball stud and socket combinations is that the ears on the ball stud head must be aligned with receiving slots in the corresponding socket when the stud is installed in the socket. This complicates automated assembly.

In other headlamp adjusters, rotation of the ball stud is restrained by mechanism provided within the adjuster itself, e.g., the "anti-rotation insert" disclosed in U.S. Pat. No. 5,707,133. Examples of other such adjusters are disclosed in U.S. Pat. Nos. 4,796,494; 5,034,870; 5,079,676; 5,163,746; and 5,775,795.

In the various types of adjusters described above, a socket is used to make the pivotable connection between the ball stud and the reflector. Examples of ball stud and corresponding socket combinations are shown in FIGS. 4 and 5 of U.S. Pat. No. 4,689,725; FIG. 2 of U.S. Pat. No. 5,161,877; FIG. 1 of U.S. Pat. No. 5,673,992; FIG. 2 of U.S. Pat. No. 5,095,411; and FIGS. 10–14 of U.S. Pat. No. 5,186,532. Additionally, at least the following U.S. patents are specifically directed toward ball joints for use in connection with headlamp adjusting mechanisms: U.S. Pat. Nos. 4,974,123; 5,047,904; and 5,063,481.

A "quarter turn" style ball socket that has been used in connection with headlamp adjusters (identified generally as 15) is shown in FIG. 1 and is identified generally as 20. As shown in FIGS. 3A and 3B, the quarter turn socket 20 is used in connection with a reflector 22 having a boss 24 extending therefrom. The boss 24 has a hole into which the quarter turn socket 20 is inserted and typically also has ramp locks 26. The quarter turn socket 20 has lugs 28 that protrude from the socket 20 which pass through the hole in the boss 24 when the socket 20 is inserted in the direction indicated by arrow 29 in FIG. 3A. The socket 20 is usually already joined with a conventional ball stud 30 (FIG. 3) prior to being inserted into the boss 24. After insertion, the socket 20 must be rotated a quarter turn to rotate the lugs 28 so that they will not be able to pass through the hole in the boss 24. This rotation also locks the socket 20 into the boss 24. In rotating the socket 20, flexible wings 32 extending from the socket 20 flex and slide over the ramp locks 26 on the boss 24. The wings 32 then snap down to prevent disengagement of the socket 20 from the boss 24 by further rotation of the socket 20 caused by rotational force imparted by the adjuster 15. Of course, ramp locks 26 may not be necessary if an adjuster 15 with internal anti-rotation, e.g. the one disclosed in U.S. Pat. No. 5,707,133, is used because no rotational force is imparted by the ball stud on the socket 20. When used in connection with a conventional ball stud 30 (FIG. 3), the quarter turn socket 20 cannot be installed to the boss 24 of the reflector 22 simply by rotating the ball stud 30. This is because the smooth finish on the conventional ball stud 30 allows the ball stud 30 to slip within the socket 20 upon rotation (indicated by arrow 33 in FIG. 3B) of the ball stud 30. Thus, a wrench or other tool that engages installation tabs 34 must be used to properly install the ball socket 20. The necessity of a special tool to complete the installation of the socket complicates installation and adds to the total assembly time of the headlamp assembly. Additionally, it is highly desirable to provide a quarter turn style socket for use in connection with a headlamp adjuster that also mounts using a quarter turn because the entire assembly can then be easily and efficiently installed in the headlamp assembly.

Additionally, existing quarter turn style ball sockets retain the ball stud in the socket using an undercut type interference. This interference requires an even wall thickness around the entire circumference of the socket in order to maximize retention of the ball stud (pull out resistance) and maintain a uniform stress distribution around the socket to prevent cracking during assembly of the socket over the ball stud head. Existing quarter turn sockets have no slots for receiving "eared" ball studs or other means to restrict ball stud rotation and therefore can only be used in connection with adjusters having internal anti-rotation capabilities.

Unsuccessful attempts have been made to provide ear receiving slots in quarter turn sockets for the purpose of allowing the sockets to be used in connection with adjusters that require an external rotation restraint, Additionally, unsuccessful attempts have been made to provide ear receiving slots in quarter turn sockets for use with adjusters having internal anti-rotation capabilities for the purpose of facilitating installation of a quarter turn adjuster/socket combination. When ear-receiving slots are added to the quarter turn style socket, the pull out resistance is reduced and the non-uniform wall thicknesses results in a concentration of stress at the slots.

Because of these problems, even if the use of ear-receiving slots in the socket were a viable possibility, there are manufacturing complications when attempting to form both ears on the ball portion of the ball stud and anti-rotation grooves or flats on the threaded shaft portion of the ball stud. Thus, even in adjusters having internal anti-rotation, such as the one disclosed in U.S. Pat. No. 5,707,133, the use of an eared ball stud to cause rotation of the quarter turn socket would be problematic.

In attempts to insert conventional eared ball studs into internally smooth quarter turn ball sockets (i.e., no ear receiving slots), it has been found that the ears press against the smooth inside walls of the socket and the resulting interference generates some resistance to rotation. However, this combination does not generate a very high level of anti-rotation resistance and, when the interference is increased (by increasing the size of the ears), the entire socket expands and does not fit into the hole in a standard size boss on the reflector. Additionally, each incremental increase in the size of the ears greatly increases the concentration of stress at the ear-socket interface which results in a higher risk of socket cracking. Thus, the use of conventional eared ball studs with quarter turn sockets is not effective.

Accordingly, a need exists for a ball stud head that can be easily installed in a quarter turn socket preferably without the use of tools, that can be used in connection with adjusters having internal anti-rotation mechanism and adjusters requiring anti-rotation at the ball stud head, that exhibits high anti-rotation characteristics and allows full pivotability, and that is cost-effective and easily manufactured and installed.

SUMMARY OF THE INVENTION

The present invention relates to an improved ball stud head configuration that is capable of being used in connection with quarter turn sockets and which solves the problems raised or not solved by existing ball stud head designs. While the present invention is particularly useful in connection with quarter turn style automotive ball sockets, it may also be used in connection with non-quarter turn automotive ball sockets and non-automotive lamp applications where similar performance capabilities and characteristics are required.

It is therefore an object of the present invention to provide a ball stud head that can be easily installed in a socket. It is another object of the present invention to provide a ball stud head that can be used in connection with headlamp adjusters having an internal anti-rotation mechanism and adjusters requiring anti-rotation at the ball stud head. It is an additional object of the present invention to provide a ball stud head that exhibits high anti-rotation characteristics and allows full pivotability when inserted into a socket. It is a further object of the present invention to provide a ball stud head that is cost-effective and easily manufactured and installed. The ball stud of the present invention provides the above identified and many additional objects. As described in more detail below and shown in the accompanying drawings, the head of the ball stud of the present invention includes a toothed portion such that the head, when inserted into a ball socket, is pivotable within the socket but is substantially non-rotatable within the socket.

An important aspect of the invention is the provision of an area on the head of the ball stud that engages the interior walls of the ball socket when assembled. The resulting engagement substantially restricts rotation of the ball stud with respect to the socket but allows substantially the same pivotability of the head within the socket as with a conventional smooth-head ball stud. The interface between the provided area and the interior of the socket results in relatively even distribution of stress levels circumferentially around the walls of the socket. The provided area can be a toothed or knurled portion around the mid-section of the head of the ball stud. If exceptionally high anti-rotation is desired or if a plastic ball stud is used, internal teeth can be molded into the socket that mate and engage with the teeth on the ball stud head to further increase anti-rotation resistance. Additionally, the teeth on the head can be formed with extensions to further grip the interior of the socket and provide still more anti-rotation.

Teeth can be formed on the ball stud head by first producing a generally spherical ball stud head using conventional cold-heading or machining techniques. After this operation, the teeth can be roll formed into the mid-section of the head using knurling roll dies or trimmed in a multi-station or secondary cold-heading process.

Installing the improved ball stud head of the present invention into a conventional socket is quite simple. The anti-rotation ball stud head is snapped into the socket where the head is retained within the socket by an undercut interference. In one embodiment, as the head is inserted, the multiple teeth encounter the interior of the socket and displace material. The engagement between the multiple teeth and the interior of the socket provides a substantially non-rotational engagement between the head and the socket while allowing pivotability substantially the same as with conventional ball stud heads. Once the ball stud head is installed in the socket, the socket is installed in the reflector of the headlamp assembly. If the socket is a quarter turn socket, this installation is accomplished by turning the ball stud a quarter turn. When the present invention is used in connection with a quarter turn socket and a quarter turn mounted headlamp adjuster, the installation into the lamp assembly can be accomplished by a simple quarter turn without using tools.

While the present invention is particularly useful in headlamp assemblies, other applications are possible and references to use in a headlamp assembly should not be deemed to limit the uses of the present invention. Rather, the present invention may be adapted for use where a pivot joint is desired but rotation of the ball stud with respect to the socket is not desired. These and other objects and advantages of the present invention will become apparent from the detailed description, claims, and accompanying drawings.

DESCRIPTION OF THE DRAWING

FIG. 1 is a partially exploded perspective view of an anti-rotation ball stud head in accordance with one embodiment of the present invention shown extending from a quarter turn headlamp adjuster and a conventional quarter turn socket;

FIG. 2 is a perspective view of an anti-rotation ball stud head in accordance with one embodiment of the present invention;

FIG. 3 is a perspective view of the head of a prior art smooth-headed ball stud;

FIG. 3A is a perspective view of a prior art ball stud in a quarter turn socket that has been inserted in the direction indicated by arrow 29 into a boss protruding from a reflector;

FIG. 3B is a perspective view of a prior art ball stud in a quarter turn socket that has been inserted into a boss protruding from a reflector, the ball stud being rotated as indicated by the arrow 33;

FIG. 4A is a perspective view of an anti-rotation ball stud head in accordance with one embodiment of the present invention engaged in a quarter turn socket that has been inserted in the direction indicated by arrow 35 into a boss protruding from a reflector;

FIG. 4B is a perspective view of an anti-rotation ball stud head in accordance with one embodiment of the present invention engaged in a quarter turn socket that has been inserted into a boss protruding from a reflector, the ball stud being rotated as indicated by arrow 37;

FIG. 5 is a partial cross-section of an anti-rotation ball stud head in accordance with the present invention inserted into a conventional quarter turn socket;

FIG. 6 is a perspective view of a ball stud head in accordance with an additional embodiment of the present invention shown during a step of the manufacture thereof;

FIG. 7 is a perspective view of the ball stud head of FIG. 6 after the completion of the manufacture thereof; and FIG. 8 is a partial cross-section of an alternative embodiment of an anti-rotation apparatus in accordance with the present invention.

DETAILED DESCRIPTION OF THE PREFERRED EMBODIMENTS

As shown in FIG. 1, one embodiment of the present invention is advantageously used in connection with a headlamp adjuster 15 and a socket 20. While the socket shown in FIG. 1 is known as a quarter turn style socket 20 because of the manner in which the socket is retained in the reflector, the invention may be used in other types of sockets where a non-rotating pivot connection is desired. As best seen in FIG. 2, the head 38 of the ball stud (identified generally as 40) of the present invention includes a toothed portion 42 such that the head 38, when inserted into the ball socket 20, is pivotable within the socket 20 but is substantially non-rotatable within the socket 20.

As shown in partial cross-section in FIG. 5, a toothed portion 42 on the head 38 of the ball stud 40 to engage the interior 44 of the ball socket 20. During assembly, the teeth of the toothed portion 42 displace material within the interior 44 of the socket 20. The resulting engagement substantially restricts rotation of the ball stud 40 with respect to the socket 20 but allows pivotability of the head 38 within the socket 20. The interface between the many teeth of the toothed portion 42 and the interior 44 of the socket 20 results stress levels distributed substantially evenly around the circumference of the interior 44 of the socket 20. As shown in FIG. 8, if exceptionally high anti-rotation is desired or if a plastic ball stud is used, internal teeth 41 can be molded into the socket 20 that mate and engage with the teeth on the ball stud head 40 to further increase anti-rotation resistance. Additionally, as shown in FIG. 7, the toothed portion 42 on the head 38 can be formed with extensions 46 to further grip the interior 44 of the socket 20 and provide additional anti-rotation.

The toothed portion 42 on the ball stud head 38 can be formed by first producing a generally spherical ball stud head 38 using conventional cold-heading or machining techniques. After this operation, the toothed portion 42 can be roll-formed into the mid-section of the head 38 using knurling roll dies or trimmed in a multi-station or secondary cold-heading process. This is generally believed to be the easiest and most cost efficient manufacturing method, however, it is possible that the toothed portion could alternatively be formed or trimmed in the cold-heading process. In manufacturing the embodiment shown in FIG. 7, a generally spherical ball stud head 38 with a ridge 48 is produced using conventional cold-heading or machining techniques (FIG. 6). Then, the toothed portion 42 is roll-formed into the mid-section of the head 38 over the ridge 48 to produce the extensions 46 shown in FIG. 7. If a plastic ball stud 40 is used, it can be manufactured, including the toothed portion 42, by injection molding.

As best shown in FIG. 5, when installing the ball stud head 38 of the present invention into a conventional quarter turn style socket 20, the anti-rotation ball stud head is snapped into the socket 20 and the head 38 is retained within the socket 20 by undercut interference. As the head 38 is inserted, the toothed portion 42 encounters the interior 44 of the socket 20 and displaces material. The engagement between the toothed portion 42 and the interior 44 of the socket 20 results in non-rotational engagement between the head 38 and the socket 20 while allowing pivotability of the head 38 within the socket 20. Once the ball stud head 38 is installed, the socket 20 may be installed in the reflector 22 of the headlamp assembly. If the socket 20 is a quarter turn style, this installation is accomplished by turning the ball stud 40 a quarter turn. The ball stud head 38 of the present invention the invention is preferably used in connection with a quarter turn socket 20 and a quarter turn mounted headlamp adjuster 15 (FIG. 1), thereby further facilitating installation into the lamp assembly because the socket 20 and the adjuster 15 can be installed in the lamp assembly with a simple quarter turn without using tools.

Ball studs in accordance with the present invention may be made from a variety of materials depending on the particular application. Ball studs used in headlamp adjusters are generally manufactured from hard metal or plastic, typically steel, zinc, brass, or nylon. Sockets used in connection with the ball stud of the present invention are preferably formed from injection molded plastic. In the present invention, in order for the toothed portion 42 to be able to create the anti-rotation engagement with the interior 44 of the socket 20, the ball stud 40 is manufactured from a material having a hardness substantially the same as or greater than the socket 20.

As illustrated by the foregoing description and shown in the Figures, the present invention is suitable as an anti-rotation ball stud for use in connecting a headlamp adjuster to a reflector. The present invention overcomes the limitations and disadvantages of existing ball studs by utilizing an effective design whereby the head can be pivotably but non-rotatably engaged in the corresponding socket, is easily installed, and is cost effective. Of course, the anti-rotation ball stud of the present invention may be used in other non-headlamp assembly applications.

Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and therefore, the invention is to be taken as including all reasonable equivalents to the subject matter of the appended claims.

I claim:

1. An anti-rotation apparatus comprising:
   a ball stud having a head, the head having a mid-section;
   a plurality of teeth disposed circumferentially about the mid-section of the head of the ball stud; and
   a quarter turn ball socket into which the head of the ball stud is engageable.

2. The anti-rotation apparatus of claim 1 wherein the head of the ball stud is engageable in the quarter turn ball socket such that the plurality of teeth interface with the quarter turn ball socket so as to restrain rotation of the ball stud with respect to the quarter turn ball socket.

3. The anti-rotation apparatus of claim 2 wherein when the head of the ball stud is engaged in the quarter turn ball socket, material within the quarter turn ball socket is displaced by the plurality of teeth.

4. The anti-rotation apparatus of claim 3 wherein the head of the ball stud and the plurality of teeth thereon are formed from a harder material than the material from which the quarter turn ball socket is formed.

5. The anti-rotation apparatus of claim 1 wherein the ball stud has a shaft ending in the head, the shaft extending from a vehicle headlamp adjusting device.

6. An anti-rotation apparatus for use with a socket, the apparatus comprising:
   a ball stud having a head, the head having a mid-section; and
   a plurality of teeth disposed circumferentially about the mid-section of the head of the ball stud, the plurality of teeth disposed about the head of the ball stud and interfaceing with a corresponding second plurality of teeth disposed within the socket so as to restrain rotation of the ball stud with respect to the socket.

7. An anti-rotation apparatus for use with a socket, the apparatus comprising:
   a ball stud having a head, the head having a mid-section;
   a plurality of teeth disposed circumferentially about the mid-section of the head of the ball stud; and
   an extension extending from each of the plurality of teeth disposed circumferentially about the mid-section of the head of the ball stud.

8. An anti-rotation pivot joint comprising:
   a socket having a substantially continuous interior;
   a ball stud, the ball stud including a head engaged in the socket, the head having a mid-section; and
   a toothed portion disposed circumferentially about the mid-section of the head of the ball stud, the toothed portion interfacing with the substantially continuous interior of the socket so as to restrain rotation of the ball stud with respect to the socket.

9. The anti-rotation pivot joint of claim 8 wherein when the head of the ball stud is first engaged in the socket, material within the interior of the socket is displaced by the toothed portion.

10. The anti-rotation pivot joint of claim 9 wherein the head and toothed portion thereon are formed from a harder material than the material from which the socket is formed.

11. The anti-rotation pivot joint of claim 8 wherein the ball stud has a shaft ending in the head, the shaft extending from a vehicle headlamp adjusting device.

12. An anti-rotation pivot joint comprising:
   a socket having an interior;
   a ball stud, the ball stud including a head engaged in the socket, the head having a mid-section; and
   a toothed portion disposed circumferentially about the mid-section of the head of the ball stud, the toothed portion interfacing with the interior of the socket so as to restrain rotation of the ball stud with respect to the socket, the toothed portion interfacing with a corresponding second toothed portion within the interior of the socket.

13. An anti-rotation pivot joint comprising:
   a socket having an interior;
   a ball stud, the ball stud including a head engaged in the socket, the head having a mid-section; and
   a toothed portion disposed circumferentially about the mid-section of the head of the ball stud, the toothed portion interfacing with the interior of the socket so as to restrain rotation of the ball stud with respect to the socket, the toothed portion further comprising a plurality of extensions extending from the toothed portion disposed circumferentially about the mid-section of the head of the ball stud.

14. An anti-rotation pivot joint comprising:
   a quarter turn style socket having an interior;
   a ball stud, the ball stud including a head engaged in the socket, the head having a mid-section; and
   a toothed portion disposed circumferentially about the mid-section of the head of the ball stud, the toothed portion interfacing with the interior of the socket so as to restrain rotation of the ball stud with respect to the socket.

15. The anti-rotation pivot joint of claim 14 wherein the ball stud has a shaft ending in the head, the shaft extending from a quarter turn mountable vehicle headlamp adjusting device.

16. A method of installing a quarter turn ball socket to a reflector comprising the following steps:
   engaging a ball stud in the quarter turn ball socket such that the ball stud is pivotable within the quarter turn ball socket but substantially non-rotatable with respect to the quarter turn ball socket;
   inserting the quarter turn ball socket in a hole in a boss extending from the reflector; and
   rotating the ball stud thereby causing rotation of the quarter turn ball socket to a position where the quarter turn ball socket cannot be removed from the boss without further rotation of the quarter turn ball socket.

17. The method of claim 16 wherein the ball stud has a head with a mid-section, the mid-section interfacing with the quarter turn ball socket so as to restrain rotation of the ball stud with respect to the quarter turn ball socket.

18. A method of connecting a headlamp adjuster to a reflector comprising the following steps:
   engaging a ball stud extending from a headlamp adjuster in a socket such that the ball stud is pivotable within the socket and is substantially non-rotatable with respect to the socket;
   inserting the socket in a hole in a boss extending from the reflector; and
   rotating the headlamp adjuster thereby causing rotation of the socket to a position where the socket cannot be removed from the boss without further rotation of the socket.

19. The method of claim 18 wherein the ball stud has a head with a mid-section, the mid-section interfacing with the socket so as to restrain rotation of the ball stud with respect to the socket.

20. The method of claim 19 wherein the headlamp adjuster is mountable by rotation thereof.

21. An anti-rotation pivot joint comprising:

a socket having a substantially continuous interior; and a ball stud, the ball stud including a head engaged in the socket, the head having a mid-section that interfaces with the interior of the socket so as to restrain rotation of the ball stud with respect to the socket.

22. The anti-rotation pivot joint of claim 21 wherein the mid-section includes a plurality of teeth.

* * * * *